(12) United States Patent
Miwa et al.

(10) Patent No.: US 10,400,850 B2
(45) Date of Patent: Sep. 3, 2019

(54) SHOCK ABSORBER

(71) Applicants: KYB Corporation, Tokyo (JP); HONDA MOTOR CO., LTD., Tokyo (JP)

(72) Inventors: Masahiro Miwa, Gifu (JP); Kazuma Ando, Gifu (JP); Yuki Watanabe, Kuala Lumpur (MY); Takafumi Kobayashi, Tochigi (JP)

(73) Assignees: KYB Corporation, Tokyo (JP); HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 15/542,740

(22) PCT Filed: Nov. 17, 2015

(86) PCT No.: PCT/JP2015/082263
§ 371 (c)(1),
(2) Date: Jul. 11, 2017

(87) PCT Pub. No.: WO2016/113996
PCT Pub. Date: Jul. 21, 2016

(65) Prior Publication Data
US 2018/0003261 A1 Jan. 4, 2018

(30) Foreign Application Priority Data

Jan. 14, 2015 (JP) .................. 2015-005239

(51) Int. Cl.
*F16F 9/54* (2006.01)
*B23K 26/24* (2014.01)
(Continued)

(52) U.S. Cl.
CPC .............. *F16F 9/54* (2013.01); *B23K 11/14* (2013.01); *B23K 26/24* (2013.01); *B60G 13/00* (2013.01);
(Continued)

(58) Field of Classification Search
CPC .... F16F 9/54; F16F 9/32; F16F 9/3242; F16F 2226/04; B62K 11/14; B62K 26/24;
(Continued)

(56) References Cited

U.S. PATENT DOCUMENTS 4,634,108 A * 1/1987 Munch ................. F16C 27/063
267/279
5,595,270 A * 1/1997 Braun ....................... F16F 9/49
188/266.6

(Continued)

FOREIGN PATENT DOCUMENTS

JP 2005-83455 A 3/2005

*Primary Examiner* — Robert A. Siconolfi
*Assistant Examiner* — San M Aung
(74) *Attorney, Agent, or Firm* — Hauptman Ham, LLP (57) ABSTRACT

A shock absorber includes a cylindrically-shaped mounting member having an outer peripheral surface bonded at one end or both ends, the mounting member having an outer diameter at an end surface side smaller than an outer diameter at a center portion, and a reinforcement welding performed at the end surface side of the mounting member at a bonding portion of the mounting member.

13 Claims, 5 Drawing Sheets (51) Int. Cl.
*B23K 11/14* (2006.01)
*B60G 13/00* (2006.01)
*F16F 9/32* (2006.01)

(52) U.S. Cl.
CPC ......... *B60G 13/003* (2013.01); *B60G 13/005* (2013.01); *F16F 9/3242* (2013.01); *B60G 2204/128* (2013.01); *B60G 2204/129* (2013.01)

(58) Field of Classification Search
CPC .. B62K 21/14; B62K 2201/06; B62K 11/006; Y10T 403/451
USPC .............. 188/321.11; 267/279, 293; 403/221
See application file for complete search history.

(56) References Cited

U.S. PATENT DOCUMENTS

| | | | | |
|---|---|---|---|---|
| 5,794,741 | A * | 8/1998 | Kasajima | F16F 9/54 188/321.11 |
| 6,749,047 | B2 * | 6/2004 | Koyano | F16F 9/38 188/321.11 |
| 7,441,759 | B2 * | 10/2008 | Franke | F16F 1/3842 267/279 |
| 2005/0023093 | A1 * | 2/2005 | Leiphart | B60G 17/08 188/283 |
| 2006/0213366 | A1 * | 9/2006 | Fenn | F16F 9/38 92/64 |

* cited by examiner

SHOCK ABSORBER

RELATED APPLICATIONS

The present application is a National Phase of International Application No. PCT/JP2015/082263, filed Nov. 17, 2015, and claims priority based on Japanese Patent Application No. 2015-005239, filed Jan. 14, 2015.

TECHNICAL FIELD

The present invention relates to a shock absorber.

BACKGROUND ART

JP2005-83455A discloses a shock absorber where a cylindrically-shaped mounting member (mounting eye) is bonded on a capping member that obstructs a lower end of an outer case.

In the above-described shock absorber, in order to enhance a strength at a bonding portion of the mounting member, reinforcement welding is performed at an outer peripheral surface side of the mounting member at the bonding portion.

SUMMARY OF INVENTION

The strength at the bonding portion of the mounting member can be also enhanced such that the reinforcement welding is performed at an end surface side of the mounting member at the bonding portion. However, in the above-described shock absorber, the outer peripheral surface of the mounting member has an equal cylindrical shape in a full width. Thus, a space between the outer peripheral surface of the mounting member and the capping member is small to make the welding difficult.

An object of the present invention is to easily perform reinforcement welding at an end surface side of a mounting member at a bonding portion of the mounting member.

According to one aspect of the present invention, a shock absorber includes a cylindrically-shaped mounting member having an outer peripheral surface bonded at one end or both ends, the mounting member having an outer diameter at an end surface side smaller than an outer diameter at a center portion, and a reinforcement welding performed at the end surface side of the mounting member at a bonding portion of the mounting member.

DESCRIPTION OF EMBODIMENTS

The following describes a shock absorber 100 according to an embodiment of the present invention with reference to the attached drawings.

The shock absorber 100 is interposed between, for example, a vehicle body and an axle shaft of an automobile (not illustrated). The shock absorber 100 is a device that generates a damping force to reduce a vibration of the vehicle body.

Figure 1:
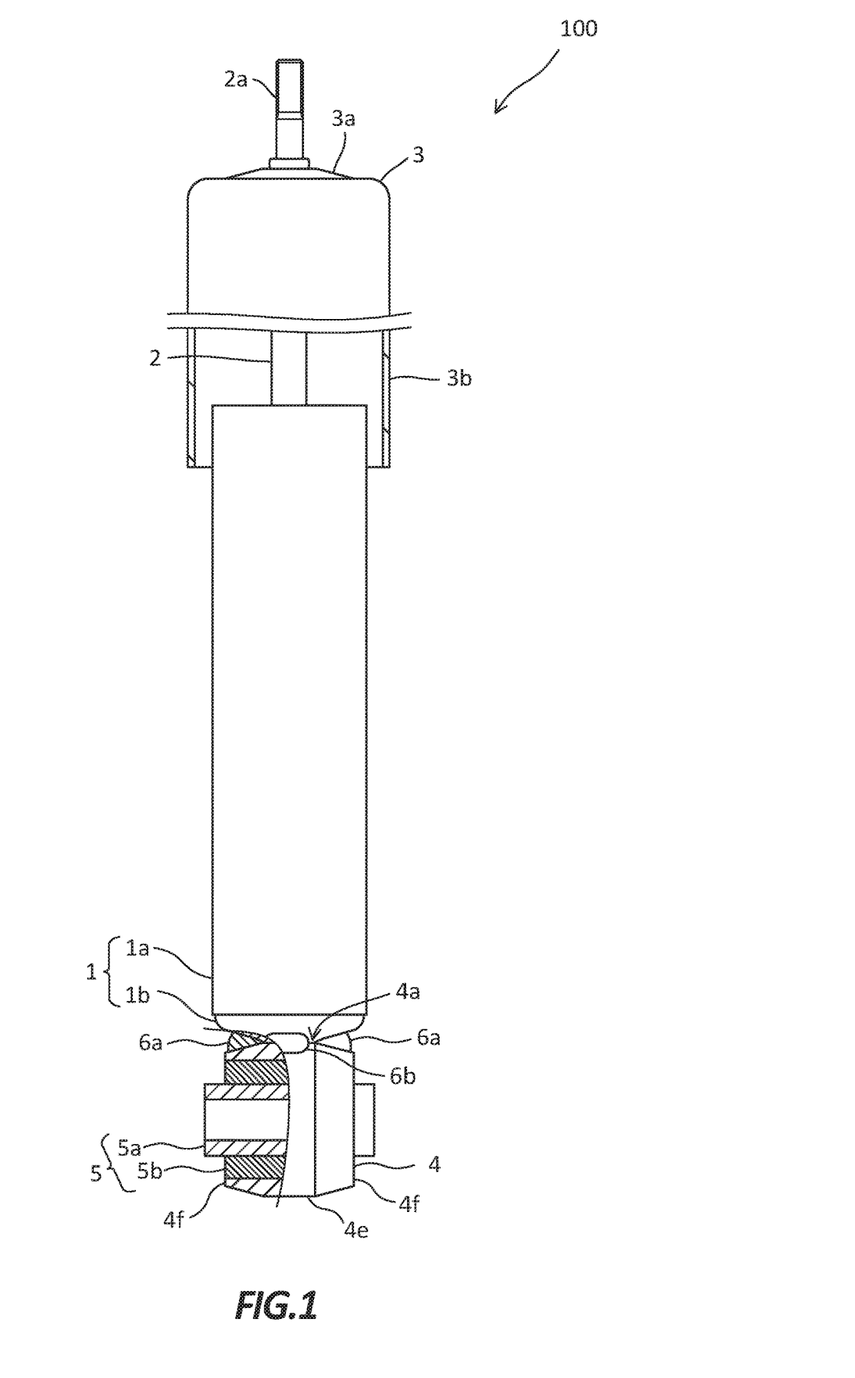
FIG. 1 is a partial cross-sectional view of a shock absorber according to an embodiment of the present invention.

As illustrated in FIG. 1, the shock absorber 100 includes an outer case 1, which is charged with a hydraulic oil as an operating fluid, a piston rod 2, which extends from one end of the outer case 1, an outer cover 3, which is secured to a distal end side of the piston rod 2 at one end, a mounting eye 4, which is a mounting member bonded on the outer case 1, and a bush 5, which is press-fitted in the mounting eye 4.

The outer case 1 includes a cylindrically-shaped tube 1a and a capping member 1b, which obstructs an end portion opposite to the piston rod 2, of the tube 1a. The capping member 1b is bonded on the tube 1a, for example, by seam welding or projection welding. It should be noted that the outer case 1 may be formed such that the end portion of the tube 1a is obstructed by closing work, without including the capping member 1b.

In the outer case 1, the hydraulic oil is charged, and compressed gas is also charged, for example, for preventing cavitation of the hydraulic oil. It should be noted that other liquid such as water may be used as the operating fluid.

The shock absorber 100 may be a mono-tube type, or may be a twin-tube type. In the case where the shock absorber 100 is the mono-tube type, the tube 1a is a cylinder. In the case where the shock absorber 100 is a twin-tube type, the tube 1a is an outer tube.

The piston rod 2 is inserted into the outer case 1 so as to freely moves into and out of the outer case 1. At an end portion of the piston rod 2 on a side extending from the outer case 1, an external thread 2a for mounting the shock absorber 100 on the vehicle body side is formed.

The outer cover 3 is secured to the distal end side of the piston rod 2, for example, by welding. Specifically, the outer cover 3 includes a bottom portion 3a, which is secured to the piston rod 2, and a pipe portion 3b, which is formed from the bottom portion 3a toward a side of the outer case 1.

In this embodiment, at the outer cover 3, the bottom portion 3a and the pipe portion 3b are integrally shaped. A structure of the outer cover 3 may be, for example, a structure where a tubular member as the pipe portion 3b is secured to a disk-shaped member as the bottom portion 3a, for example, by welding or press-fitting.

The mounting eye 4 has a cylindrical shape, and has an outer peripheral surface 4e bonded on the outer case 1, which is a bonded member, for example, by the projection welding. Specifically, the mounting eye 4 is bonded on the capping member 1b. Reinforcement weldings 6a and 6b are performed at a bonding portion 4a of the mounting eye 4 to dispose a reinforcement welding portion. This will be described later.

It should be noted that, when the outer case 1 is formed by the above-described closing work, the mounting eye 4 is directly bonded on a worked portion of the tube 1a.

The bush 5 includes an inner pipe 5a, into which a bolt (not illustrated) for mounting the shock absorber 100 on a side of the axle shaft is inserted, and a rubber portion 5b, which is adhered to the inner pipe 5a by vulcanization. It should be noted that, for example, a ball joint bush may be used as the bush.

Subsequently, the reinforcement welding 6a and 6b performed at the bonding portion 4a of the mounting eye 4 will be described.

Figure 2:
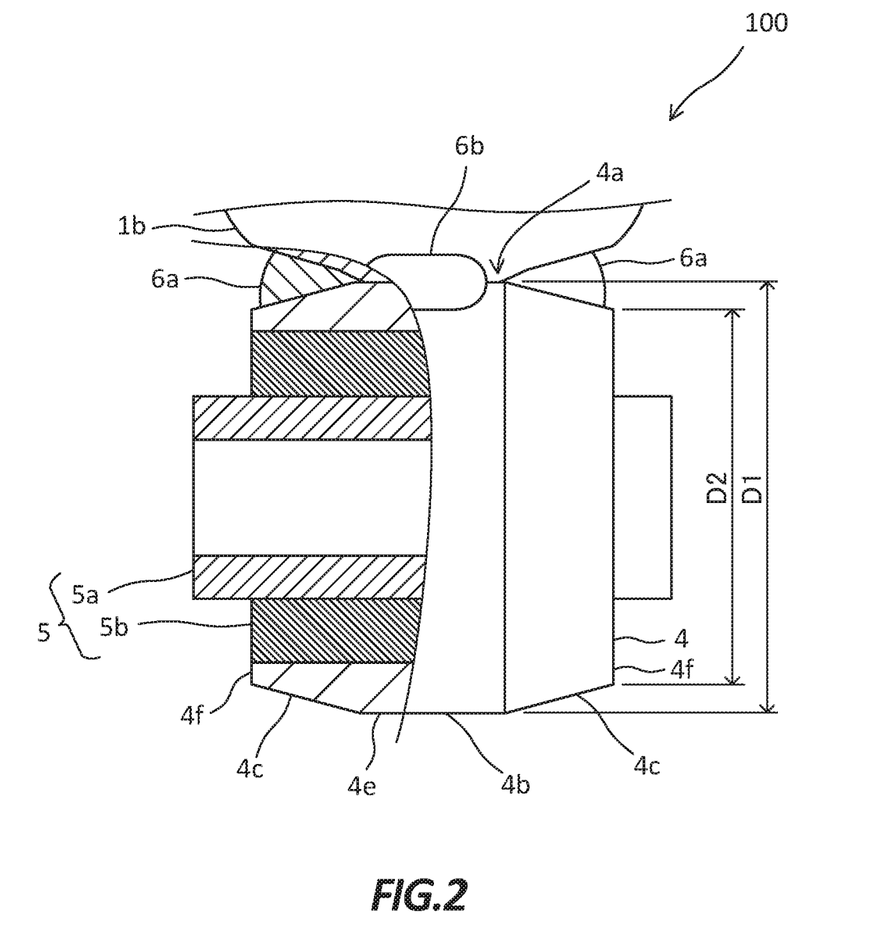
FIG. 2 is an enlarged view around a mounting eye.

The reinforcement welding portion is disposed at the bonding portion 4a of the mounting eye 4. Specifically, as illustrated in FIG. 1 and FIG. 2, at the bonding portion 4a of the mounting eye 4, the reinforcement welding 6a is performed from an axial direction side of the mounting eye 4, that is, an end surface 4f side of the mounting eye 4, and the reinforcement welding 6b is performed from a side perpendicular to the axial direction of the mounting eye 4, that is, a side of the outer peripheral surface 4e of the mounting eye 4. The reinforcement weldings 6a and 6b are performed, for example, by arc welding.

Figure 3:
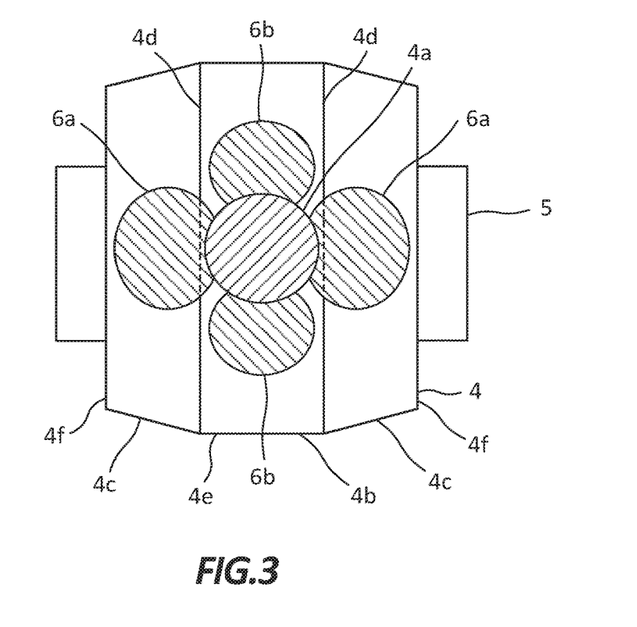
FIG. 3 is a drawing of the mounting eye viewed from a bonding portion side, and illustrates a state where reinforcement welding is performed at four places.

In this embodiment, as illustrated in FIG. 3, the reinforcement welding 6a is performed at both end surfaces 4f sides of the mounting eye 4 at the bonding portion 4a, and the reinforcement welding 6b is performed at both outer peripheral surfaces 4e sides of the mounting eye 4 at the bonding portion 4a. Thus, in the shock absorber 100, the reinforcement weldings 6a and 6b are performed at four places: both end surfaces 4f sides and both outer peripheral surfaces 4e sides of the mounting eye 4 at the bonding portion 4a to enhance a strength of the bonding portion 4a.

It should be noted that the reinforcement welding 6a may be performed only at any one of the end surfaces 4f sides, depending on the strength required for the bonding portion 4a of the mounting eye 4. The same applies to the reinforcement welding 6b. Only any of the reinforcement weldings 6a and 6b may be performed.

Now, the reinforcement welding 6b can be easily performed such that a space between the outer peripheral surface 4e of the mounting eye 4 and the capping member 1b is large. Meanwhile, for the reinforcement welding 6a, for example, when an outer peripheral surface of a mounting eye has an equal cylindrical shape in a full width, a space between the outer peripheral surface of the mounting eye and the capping member 1b is small, thus making the welding difficult.

In contrast, in this embodiment, as illustrated in FIG. 2, the mounting eye 4 is formed such that an outer diameter D2 at the end surface 4f side is smaller than an outer diameter D1 of a center portion 4b. Specifically, the mounting eye 4 includes tapered portions 4c whose outer diameters decrease from the center portion 4b sides toward the end surfaces 4f sides, at both end portions.

This widens a space at the end surface 4f side of the mounting eye 4 at the bonding portion 4a. Thus, the reinforcement welding 6a can be easily performed. A space where a bead of the reinforcement welding 6a is fitted can be ensured. Thus, this can prevent the bead from protruding to an inner peripheral surface of the mounting eye 4.

As illustrated in FIG. 3, the tapered portion 4c of the mounting eye 4 has a starting point 4d at the bonding portion 4a side. Such that the starting point 4d is disposed at the end surface 4f side with respect to the bonding portion 4a, the tapered portion 4c and the bonding portion 4a do not overlap one another.

That is, in this embodiment, the mounting eye 4 is bonded on the outer case 1 using an equal cylindrical-shaped part at the outer peripheral surface 4e. Accordingly, a bond of the mounting eye 4 can be stably performed.

Figure 4:
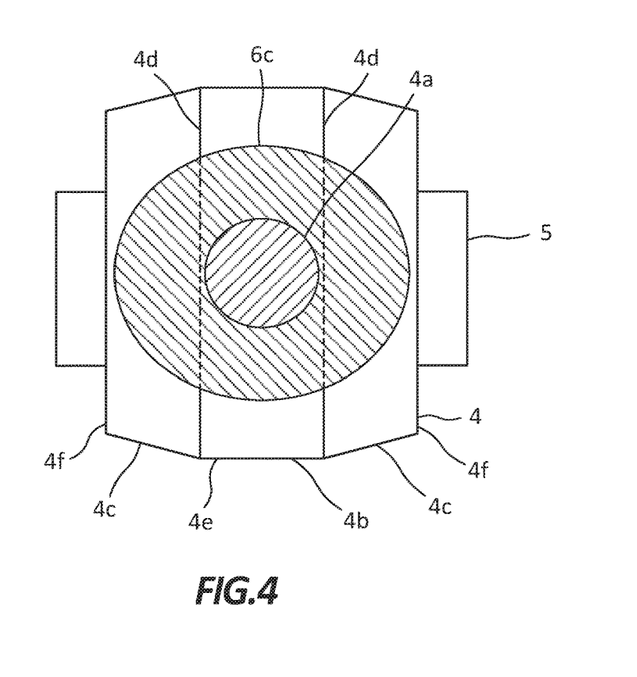
FIG. 4 is a drawing of the mounting eye viewed from the bonding portion side, and illustrates a state where the reinforcement welding is performed at a whole circumference.

In the above-described embodiment, the reinforcement weldings 6a and 6b are performed at the four places: both end surfaces 4f sides and both outer peripheral surfaces 4e sides of the mounting eye 4 at the bonding portion 4a. However, as illustrated in FIG. 4, a reinforcement welding 6c may be performed at a whole circumference of the bonding portion 4a.

Figure 5:
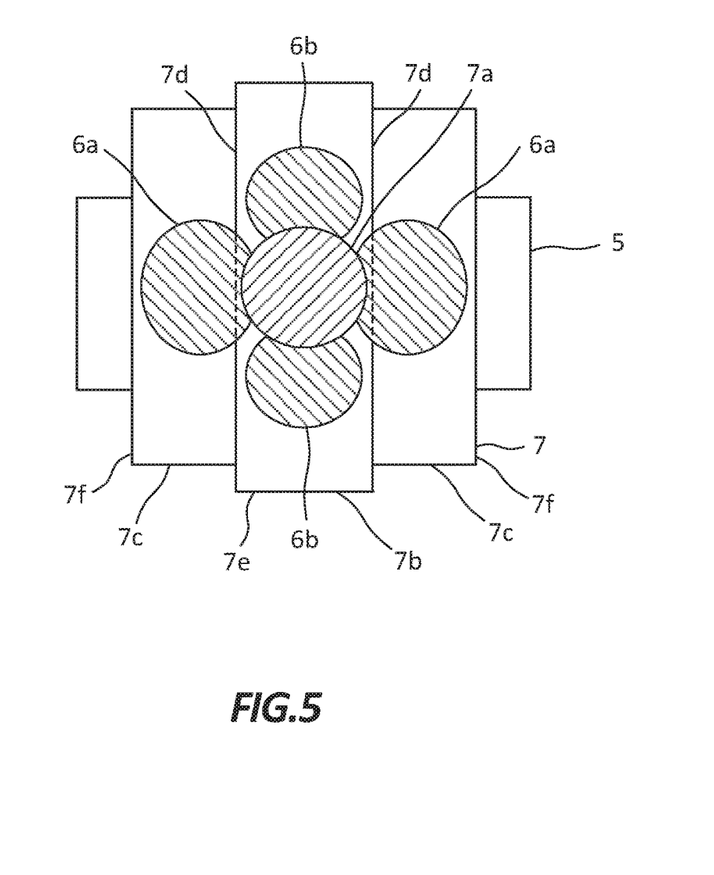
FIG. 5 is a drawing of a mounting eye according to a modification viewed from a bonding portion side, and illustrates a state where the reinforcement welding is performed at four places.

A shape of the mounting eye, for example, like a shape of a mounting eye 7 illustrated in FIG. 5, may be a shape that disposes small-diameter portions 7c whose outer diameters are smaller than an outer diameter of a center portion 7b, at both end portions.

This, similarly to the case where the mounting eye 4 is bonded on the outer case 1, widens a space at an end surface 7f side of the mounting eye 7 at a bonding portion 7a. Thus, the reinforcement welding 6a can be easily performed. A space where the bead of the reinforcement welding 6a is fitted can be ensured. Thus, this can prevent the bead from protruding to an inner peripheral surface of the mounting eye 7.

The small-diameter portion 7c of the mounting eye 7 has a starting point 7d at the bonding portion 7a side. Such that the starting point 7d is disposed at the end surface 7f side with respect to the bonding portion 7a, the small-diameter portion 7c and the bonding portion 7a do not overlap one another.

That is, the mounting eye 7 is bonded on the outer case 1 using an equal cylindrical-shaped part at an outer peripheral surface 7e. Accordingly, a bond of the mounting eye 7 can be stably performed.

Figure 6:
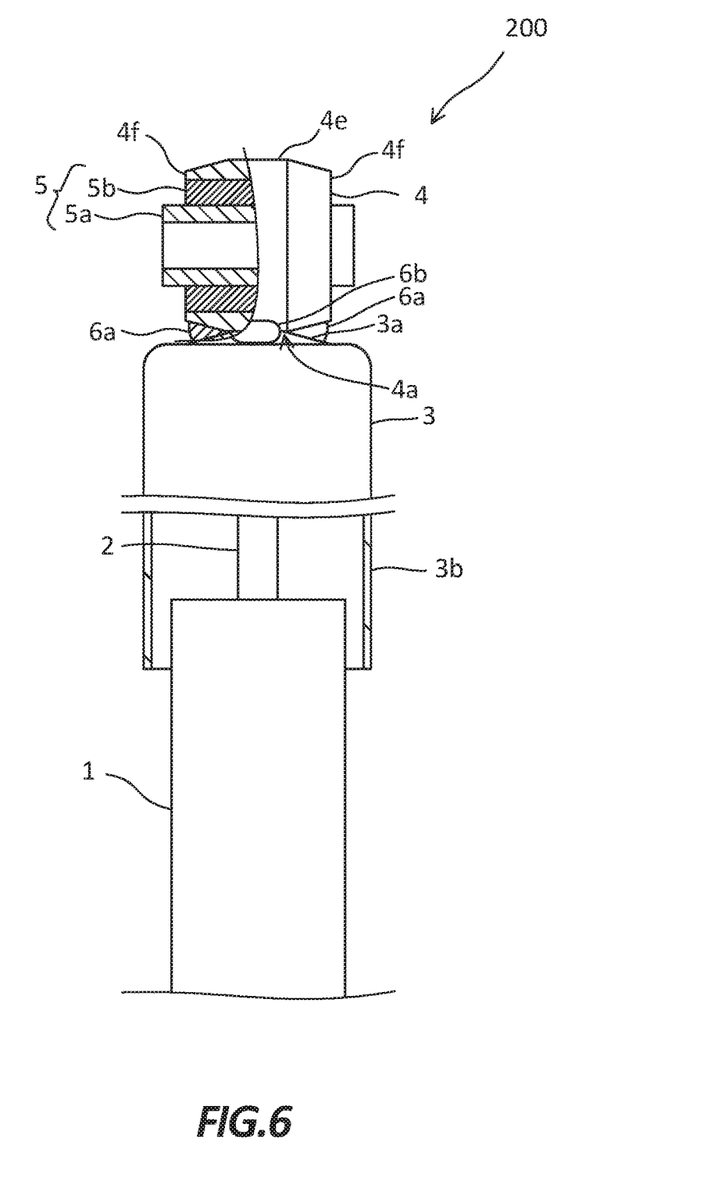
FIG. 6 is a partial cross-sectional view of a shock absorber according to the modification of the present invention.

In the above-described embodiment, the mounting eye 4 is disposed at the end portion of the outer case 1. However, like a shock absorber 200 illustrated in FIG. 6, the mounting eye 4 may be disposed at an end portion of the piston rod 2. The mounting eyes 4 each may be disposed at both ends of the shock absorber 100, that is, both of the end portion of the outer case 1 and the end portion of the piston rod 2.

The following describes the configuration, the action, and the effect according to the embodiment of the present invention as a whole.

In the shock absorber 100, at one end or both ends, the cylindrically-shaped mounting eyes 4 and 7 whose outer diameters at the end surfaces 4f and 7f sides are smaller than the outer diameters of the center portions 4b and 7b are disposed such that the outer peripheral surfaces 4e and 7e are bonded, and the reinforcement weldings 6a and 6c are performed at the end surfaces 4f and 7f sides of the mounting eyes 4 and 7 at the bonding portions 4a and 7a of the mounting eyes 4 and 7.

The mounting eye 4 includes the tapered portions 4c whose outer diameters decrease from the center portion 4b side toward the end surfaces 4f sides, at both end portions.

The mounting eye 7 includes the small-diameter portions 7c whose outer diameters are smaller than the outer diameter of the center portion 7b, at both end portions.

In these configurations, since the outer diameters at the end surfaces 4f and 7f sides of the mounting eyes 4 and 7 are smaller than the outer diameters of the center portions 4b and 7b, the spaces at the end surfaces 4f and 7f sides of the mounting eyes 4 and 7 at the bonding portions 4a and 7a are widened. Accordingly, the reinforcement weldings 6a and 6c can be easily performed at the end surfaces 4f and 7f sides of the mounting eyes 4 and 7 at the bonding portions 4a and 7a. The spaces where the beads of the reinforcement weldings 6a and 6c are fitted can be ensured. Thus, this can prevent the beads from protruding to the inner peripheral surfaces of the mounting eyes 4 and 7.

The starting point 4d at the bonding portion 4a side at the tapered portion 4c of the mounting eye 4 is disposed at the end surface 4f side with respect to the bonding portion 4a.

The starting point 7d at the bonding portion 7a side at the small-diameter portion 7c of the mounting eye 7 is disposed at the end surface 7f side with respect to the bonding portion 7a.

In these configurations, the mounting eyes 4 and 7 are bonded on the shock absorber 100 using the equal cylindrical-shaped parts at the outer peripheral surfaces 4e and 7e. Accordingly, the bonds of the mounting eyes 4 and 7 can be stably performed.

The reinforcement weldings 6a and 6b are performed at the four places: both end surfaces 4f and 7f sides and both outer peripheral surfaces 4e and 7e sides of the mounting eyes 4 and 7 at the bonding portions 4a and 7a.

In this configuration, the reinforcement weldings 6a and 6b are performed at the four places of the bonding portions 4a and 7a to enhance the strengths of the bonding portions 4a and 7a.

The reinforcement welding 6c is performed at the whole circumferences of the bonding portions 4a and 7a.

In this configuration, the reinforcement welding 6c is performed at the whole circumferences of the bonding portions 4a and 7a to enhance the strengths of the bonding portions 4a and 7a.

Embodiments of the present invention were described above, but the above embodiments are merely examples of applications of the present invention, and the technical scope of the present invention is not limited to the specific constitutions of the above embodiments.

For example, in the above-described embodiment, the mounting eye 4 includes the tapered portions 4c, and the mounting eye 7 includes the small-diameter portions 7c. However, the shape of the mounting eye may be a shape that disposes a tapered portion at one end portion and disposes a small-diameter portion at the other end portion.

The shape of the end portion of the mounting eye, for example, may be a shape that changes to the small-diameter portion in its course of the tapered portion from the center portion side toward the end surface side, or may be a shape that changes to the tapered portion in its course of the small-diameter portion.

With respect to the above description, the contents of application No. 2015-5239, with a filing date of Jan. 14, 2015 in Japan, are incorporated herein by reference.

The invention claimed is:

1. A shock absorber, comprising:
   a cylindrically-shaped mounting member having an outer peripheral surface bonded at one end or both ends, the mounting member having an outer diameter at an end surface side smaller than an outer diameter at a center portion; and
   a reinforcement welding performed at the end surface side of the mounting member at a bonding portion of the mounting member,
   wherein
      the mounting member is bonded by projection welding, and
      the reinforcement welding is performed by arc welding.
2. The shock absorber according to claim 1, wherein
   the mounting member includes tapered portions at both end portions, the tapered portions having outer diameters that decrease from the center portion side toward the end surface sides.
3. The shock absorber according to claim 1, wherein
   the mounting member includes small-diameter portions at both end portions, the small-diameter portions having outer diameters smaller than an outer diameter of the center portion, and the small-diameter portion has an equal cylindrical shape in a full width.
4. The shock absorber according to claim 2, wherein
   a starting point at the bonding portion side at the tapered portion is disposed at the end surface side with respect to the bonding portion.
5. The shock absorber according to claim 3, wherein
   a starting point at the bonding portion side at the small-diameter portion is disposed at the end surface side with respect to the bonding portion.
6. The shock absorber according to claim 1, wherein
   the reinforcement welding is performed at four places: both of the end surface sides and both of the outer peripheral surface sides of the mounting member at the bonding portion.
7. The shock absorber according to claim 1, wherein
   the reinforcement welding is performed at a whole circumference of the bonding portion.
8. The shock absorber according to claim 1, further comprising:
   an outer case in which an operating fluid is charged; and
   a piston rod that extends from one end of the outer case,
   wherein the mounting member is bonded on the outer case.
9. A shock absorber, comprising:
   a cylindrically-shaped mounting member having an outer peripheral surface bonded at one end or both ends, the mounting member having an outer diameter at an end surface side smaller than an outer diameter at a center portion;
   a reinforcement welding performed at the end surface side of the mounting member at a bonding portion of the mounting member;
   an outer case in which an operating fluid is charged; and
   a piston rod that extends from one end of the outer case, wherein
      the mounting member is a mounting eye configured to receive a bush press-fitted therein,
      the outer peripheral surface the mounting eye is bonded on the outer case at the center portion,
      the mounting eye further includes end surfaces opposing each other in an axial direction of the mounting eye, the end surfaces connected by the outer peripheral surface of the mounting eye, and
      at least one bead of the reinforcement welding welds the mounting eye to the outer case, and has a width decreasing along the axial direction of the mounting eye from the end surfaces of the mounting eye toward the center portion of the mounting eye.
10. The shock absorber according to claim 9, wherein
    said at least one bead of the reinforcement welding is a single bead extending continuously around a location where the outer peripheral surface the mounting eye is bonded on the outer case.
11. The shock absorber according to claim 9, wherein
    said at least one bead of the reinforcement welding includes a plurality of beads arranged at an interval around a location where the outer peripheral surface the mounting eye is bonded on the outer case.
12. The shock absorber according to claim 9, wherein
    the mounting eye further has tapered end portions on opposite sides of the center portion along the axial direction of the mounting eye,
    the tapered end portions have outer diameters that decrease from the center portion to the end surfaces, and said at least one bead of the reinforcement welding is tapered along the axial direction of the mounting eye from the end surfaces of the mounting eye toward the center portion of the mounting eye.

13. The shock absorber according to claim 9, wherein
the mounting eye further has small-diameter end portions on opposite sides of the center portion along the axial direction of the mounting eye, the small-diameter end portions have outer diameters smaller than an outer diameter of the center portion, and the outer diameter of each of the small-diameter portions is constant over a full width of said small-diameter portion in the axial direction of the mounting eye.

* * * * *